United States Patent
Bruns et al.

(10) Patent No.: US 8,000,853 B2
(45) Date of Patent: Aug. 16, 2011

(54) METHOD AND DEVICE FOR OPERATING AN INTERNAL COMBUSTION ENGINE

(75) Inventors: Carsten Bruns, Regensburg (DE); Alexander Ketterer, Pettendorf/Adlersberg (DE); Gerd Rösel, Regensburg (DE); Michaela Schneider, Wiesenfelden (DE)

(73) Assignee: Continental Automotive GmbH, Hannover (DE)

( * ) Notice: Subject to any disclaimer, the term of this patent is extended or adjusted under 35 U.S.C. 154(b) by 542 days.

(21) Appl. No.: 12/281,381

(22) PCT Filed: Feb. 1, 2007

(86) PCT No.: PCT/EP2007/050993
§ 371 (c)(1),
(2), (4) Date: Sep. 2, 2008

(87) PCT Pub. No.: WO2007/101761
PCT Pub. Date: Sep. 13, 2007

(65) Prior Publication Data
US 2009/0012671 A1    Jan. 8, 2009

(30) Foreign Application Priority Data
Mar. 3, 2006 (DE) .................... 10 2006 009 989

(51) Int. Cl.
*G01M 15/04* (2006.01)
(52) U.S. Cl. ........................................................ 701/29
(58) Field of Classification Search .................. 701/29
See application file for complete search history.

(56) References Cited

U.S. PATENT DOCUMENTS

| 5,158,059 | A | | 10/1992 | Kuroda ............................ 123/690 |
| 5,417,099 | A | * | 5/1995 | Ohuchi ............................ 73/23.32 |
| 5,431,042 | A | * | 7/1995 | Lambert et al. ............. 73/114.71 |
| 5,524,078 | A | | 6/1996 | Kolb et al. ................ 364/424.03 |
| 5,941,918 | A | * | 8/1999 | Blosser ............................ 701/29 |
| 6,463,732 | B2 | | 10/2002 | Baeuerle et al. ................ 60/274 |
| 6,539,705 | B2 | | 4/2003 | Beer et al. ........................ 60/274 |
| 6,604,032 | B1 | | 8/2003 | Möller ............................. 701/29 |
| 7,891,170 | B2 | * | 2/2011 | Rosel et al. ...................... 60/285 |
| 2002/0112467 | A1 | * | 8/2002 | Uranishi ........................... 60/277 |
| 2002/0157382 | A1 | * | 10/2002 | Sakai et al. ...................... 60/285 |
| 2006/0120430 | A1 | * | 6/2006 | Bayerle et al. ..................... 374/1 |
| 2007/0144145 | A1 | * | 6/2007 | Takatsuto et al. ................ 60/277 |

(Continued)

FOREIGN PATENT DOCUMENTS

DE    44 00 203 C1    8/1995

(Continued)

*Primary Examiner* — Jamisue A Plucinski
*Assistant Examiner* — Michael Lang
(74) *Attorney, Agent, or Firm* — King & Spalding L.L.P.

(57) ABSTRACT

During a first driving cycle, a combustion process is controlled in at least one combustion chamber for the purpose of performing a check on an emission reduction system of an internal combustion engine. During a second driving cycle following the first cycle, a check is performed to establish whether an error in the emission reduction system was detected during the first cycle. An idle time between the first and the second cycles is determined, in the event of an error of the emission reduction system detected during the first cycle. During the second cycle, the combustion process in the at least one combustion chamber is only controlled for the purpose of the check on the emission reduction system, in the event of an error detected in the emission reduction system during the first cycle and in the event of the idle time being longer than a pre-determined repair time.

15 Claims, 2 Drawing Sheets

U.S. PATENT DOCUMENTS

| | | | |
|---|---|---|---|
| 2007/0179691 A1* | 8/2007 | Grenn et al. | 701/29 |
| 2007/0199304 A1* | 8/2007 | Rosel et al. | 60/285 |
| 2009/0012671 A1* | 1/2009 | Bruns et al. | 701/29 |
| 2009/0090097 A1* | 4/2009 | Gaskins | 60/277 |
| 2009/0241925 A1* | 10/2009 | Behr et al. | 123/690 |

FOREIGN PATENT DOCUMENTS

| | | |
|---|---|---|
| DE | 199 53 601 A1 | 5/2001 |
| DE | 100 31 924 A1 | 1/2002 |
| WO | WO 98/44251 A1 | 10/1998 |
| WO | WO 2006/027299 A1 | 3/2006 |

* cited by examiner

METHOD AND DEVICE FOR OPERATING AN INTERNAL COMBUSTION ENGINE

CROSS-REFERENCE TO RELATED APPLICATIONS

This application is a U.S. national stage application of International Application No. PCT/EP2007/050993 filed Feb. 1, 2007, which designates the United States of America, and claims priority to German application number 10 2006 009 989.3 filed Mar. 3, 2006, the contents of which are hereby incorporated by reference in their entirety.

TECHNICAL FIELD

The invention relates to a method and a device for operating an internal combustion engine. The internal combustion engine includes an induction tract and an exhaust gas tract with an emission reduction system. The induction tract and the exhaust gas tract communicate with a combustion chamber of the internal combustion engine depending on the switching position of at least one gas inlet valve or at least one gas exhaust valve.

BACKGROUND

A method for checking an exhaust gas catalyzer of an internal combustion engine is known from DE 43 328 38 C2. The exhaust gas catalyzer is arranged in an exhaust gas duct of the internal combustion engine. The internal combustion engine features a Lambda control device which comprises a Lambda probe arranged upstream of the exhaust gas catalyzer and regulates an air-/fuel ratio to a predetermined setpoint value. To check the conversion capability of the exhaust gas catalyzer, in stationary operation with the internal combustion engine at operating temperature, an oxygen charge of the exhaust gas catalyzer is increased by a control intervention of the Lambda control device during a diagnosis period up to a predetermined value. During the diagnosis period the NOX concentration in the exhaust gas duct upstream of the 3-way exhaust gas catalyzer is detected using an NOX sensor. A stationary diagnosis value is determined from values of the NOX concentration during at least one Lambda controller oscillation. The diagnostic value is compared to a predetermined threshold value and, if the threshold value is exceeded, it is concluded that the exhaust gas catalyzer has aged.

SUMMARY

A method and a device for operating an internal combustion engine can be designed which make low-emission operation of the internal combustion engine possible.

According to an embodiment, a method for operating an internal combustion engine, which includes an induction tract and an exhaust gas tract, that communicate with the at least one combustion chamber of the internal combustion engine depending on the switching position of at least one gas inlet valve or at least one gas exhaust valve, may comprise the steps of:—within a first driving cycle of the internal combustion engine, controlling a combustion process in the at least one combustion chamber for the purpose of checking an emission reduction system of the internal combustion engine, —in a second driving cycle after the first driving cycle, checking as to whether an error of the emission reduction system was detected during the first driving cycle, —determining an idle time of the internal combustion engine between the first and the second driving cycle if during the first driving cycle an error of the emission reduction system was detected, and—in the second driving cycle of the internal combustion engine, controlling the combustion process in the at least one combustion chamber only for the purpose of checking the emission reduction system if an error of the emission reduction system was detected during the first driving cycle and if the idle time was greater than a predetermined repair time.

According to another embodiment, a device for operating an internal combustion engine comprising an induction tract and an exhaust gas tract that communicate with the at least one combustion chamber of the internal combustion engine depending on the switching position of at least one gas inlet valve or at least one gas exhaust valve, may be operable—to control a combustion process in the at least one combustion chamber for the purposes of checking an emission reduction system of the internal combustion engine within a first driving cycle of the internal combustion engine, —to check in a second driving cycle after the first driving cycle whether an error of the emission reduction system was detected during the first driving cycle, —to determine an idle time of the internal combustion engine between the first and the second driving cycle, if an error of the emission reduction system was detected during the first driving cycle, and—to control the combustion process in the at least one combustion chamber only for the purpose of checking the emission reduction system in the second driving cycle of the internal combustion engine, if during the first driving cycle an error of the emission reduction system was detected and if the idle time was greater than a predetermined repair time.

According to a further embodiment, the method and device may further comprise the step of monitoring, for checking the emission reduction system, an exhaust gas catalyzer of the internal combustion engine in respect of an oxygen storage capability of the exhaust gas catalyzer. According to a further embodiment, the method and device may further comprise the step of checking, in the second driving cycle of the internal combustion engine, the emission reduction system only if the idle time was longer than twenty minutes. According to a further embodiment, the method and device may further comprise the step of detecting the idle time by a timer. According to a further embodiment, the method and device may further comprise the step of determining the idle time by an oil temperature or a coolant temperature of the internal combustion engine being compared at the end of the first driving cycle with the oil temperature or the coolant temperature at the beginning of the second driving cycle and by the idle time being determined from the difference between the two oil temperatures or the two coolant temperatures.

BRIEF DESCRIPTION OF THE DRAWINGS

The invention is explained in greater detail below with reference to the schematic drawings.

The figures show.

Elements with identical construction or which function in the same way are identified by the same reference symbols in all figures.

DETAILED DESCRIPTION

Figure 1:
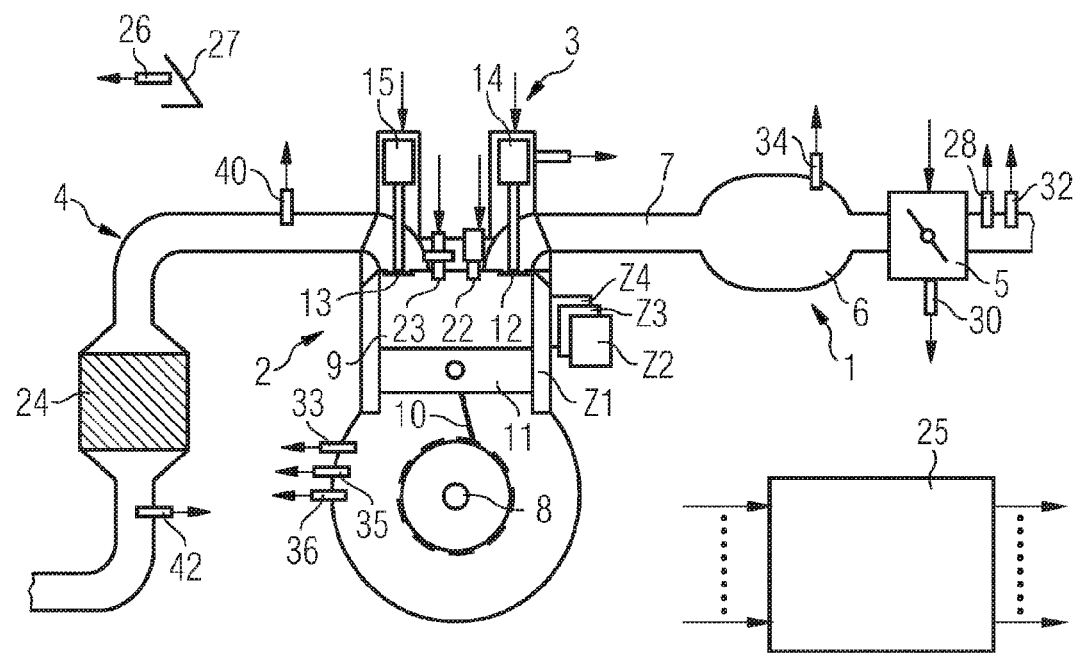
FIG. 1 an internal combustion engine.

According to various embodiments, in a method and a device for operating an internal combustion engine, the internal combustion engine includes an induction tract and an exhaust gas tract with an exhaust gas catalyzer. The induction tract and the exhaust gas tract communicate with a combustion chamber of the internal combustion engine depending on the switching position of at least one gas inlet valve or at least one gas exhaust valve. Within a first driving cycle of the internal combustion engine a combustion process is controlled in the at least one combustion chamber of the internal combustion engine for the purpose of checking the emission reduction system. In a second driving cycle after the first driving cycle a check is made as to whether an emission reduction system error has been detected during the first driving cycle. If an error of the emission reduction system was detected during the first driving cycle, an idle period of the internal combustion engine between the first and the second driving cycle is determined. In the second driving cycle of the internal combustion engine the combustion process in the at least one combustion chamber is only controlled for the purpose of checking the emission reduction system if the error of the emission reduction system has been detected during the first driving cycle and if the idle period was greater than a predetermined repair time.

This enables the combustion process only to be controlled for the purpose of checking the emission reduction system if there is the possibility that the emission reduction system is functioning correctly. Especially if during the control of the combustion process for the purpose of checking of the emission reduction system a pollutant generation of the combustion process is greater than the pollutant generation of the combustion process outside the checking of the emission reduction system, the possibility of deactivating the checking of the emission reduction system enables the generation of pollutants during the combustion process only to increase if it is possible for the emission reduction system to operate correctly. Thus the possibility of deactivating the checking of the emission reduction system contributes to low-emission operation of the internal combustion engine. Furthermore this can contribute to enabling an emission reduction system to be used which is less powerful than the emission reduction system that must be used without the deactivation option of checking the emission reduction system. In particular this can contribute to enabling an exhaust gas catalyzer of the emission reduction system to be used with a smaller degree of maximum oxygen charging than the exhaust gas catalyzer without the deactivation option which must be used during the checking of the emission reduction system. The degree of oxygen charge can also be referred to as the oxygen reservoir. Furthermore this can contribute to a pollutant threshold value that is less demanding being able to be selected than without the option of deactivating the checking of the emission reduction system.

In an advantageous embodiment of the method the exhaust gas catalyzer is monitored in respect of an oxygen reservoir capability of the exhaust gas catalyzer for checking the emission reduction system. This contributes to enabling especially precise monitoring of the emission reduction system. This further makes it possible to detect whether the exhaust gas catalyzer is functioning correctly.

In a further advantageous embodiment of the method, in the second driving cycle of the internal combustion engine the emission reduction system is only checked if the idle time was longer than 20 minutes. This contributes to enabling precise detection to be undertaken of whether the error of the emission reduction system, especially of the exhaust gas catalyzer could be rectified.

In a further advantageous embodiment of the method the idle time is detected with a timer. This contributes to enabling the idle time to be determined especially simply and precisely.

In a further advantageous embodiment of the method the idle time is determined by comparing an oil temperature and/or a coolant temperature of the internal combustion engine at the end of the first driving cycle with the oil temperature or the coolant temperature at the beginning of the second driving cycle and by determining the idle time from the difference between the two oil temperatures or the two coolant temperatures. This enables the idle time to be precisely determined without the idle time having to be detected directly.

The advantageous embodiments of the method can easily be transferred as advantageous embodiments to the device.

An internal combustion engine (FIG. 1) comprises an induction tract 1, an engine block 2, a cylinder head 3 and an exhaust gas tract 4. The induction tract 1 preferably may comprise a throttle flap 5, a collector 6 and an inlet manifold 7 which is routed through to a cylinder Z1 via an inlet duct in a combustion chamber 9 of the motor block 2. The motor block 2 includes a crankshaft 8 which is coupled via a connecting rod 10 to the piston 11 of the cylinder Z1. The internal combustion engine can be preferably arranged in a motor vehicle.

The cylinder head 3 includes valve gear with at least one gas inlet valve 12, at least one gas exhaust valve 13 and valve-actuating mechanisms 14, 15. The cylinder head 3 further includes an injection valve 22 and a spark plug 23. Alternatively the injection valve 22 can also be arranged in the inlet manifold 7.

The exhaust gas tract 4 includes an exhaust gas catalyzer 24 that can be preferably embodied as a three-way catalyzer and that belongs to an emission reduction system of the internal combustion engine. The exhaust gas catalyzer 24 is suitable for storing and emitting oxygen as a function of a degree of oxygen charging of the exhaust gas catalyzer 24. If the degree of oxygen charging is at its maximum, no further oxygen can be accepted by the exhaust gas catalyzer 24. If the degree of oxygen charge is minimal, the exhaust gas catalyzer 24 cannot emit any oxygen. Furthermore the emission reduction system, especially in a diesel engine, can include a return of exhaust gases from the exhaust gas tract 4 and/or the combustion chamber 9 into the induction tract 1 or the combustion chamber 9. When the exhaust gas is returned an exhaust gas recirculation rate can be set for example by a valve overlap phase, in which the gas inlet valve 12 and the gas exhaust valve 13 are simultaneously opened. Returning the exhaust gas for example brings about a lower combustion chamber temperature in the combustion chamber 9 than without return of the exhaust gas. The lower combustion temperature leads to lower production of pollutants in the combustion process than with a higher combustion temperature.

A control device 25 is provided to which sensors are assigned which detect different process variables and determine the value of the process variable in each case. Operating variables include the process variables and variables of the internal combustion engine derived from said process variables. The control device 25 determines as a function of at least one of the operating variables at least one manipulated variable which is then converted into one or more correction signals for controlling the actuators by means of corresponding actuator drives. The control device 25 can also be referred to as the device for operating the internal combustion engine.

The sensors are a pedal position sensor 26, which detects a position of the gas pedal 27, an air mass sensor 28, which detects an air mass flow upstream of the throttle flap 5, a throttle flap position sensor 30, which detects a degree of opening of the throttle flap 5, a first temperature sensor 32, which detects an induction air temperature, a second temperature sensor which detects a coolant temperature TCO, a third temperature sensor which detects an oil temperature TOIL, an inlet manifold sensor 34, which detects an inlet manifold pressure in the collector 6 and a crankshaft sensor 36, which detects a crankshaft angle to which an engine speed is then assigned. Furthermore an exhaust gas probe 40 can be preferably arranged upstream of the exhaust gas catalyzer 24 in the exhaust gas tract, of which the measuring signal taking into account a gas delay from the combustion chamber 9 to the waste gas probe 40 is representative of an air/fuel ratio in the combustion chamber and an exhaust gas probe 42 downstream of the exhaust gas catalyzer by which the oxygen charge capability of the exhaust gas catalyzer 24 can be checked. The exhaust gas probes 40, 42 upstream and/or downstream of the exhaust gas catalyzer 24 are further elements of the emission reduction system of the internal combustion engine. Depending on the embodiment, any subset of said sensors can be present or additional sensors can also be present.

The actuators are for example the throttle flap 5, the gas inlet and gas exhaust valve 12, 13, the injection valve 22 and/or the spark plugs 23.

As well as the cylinder Z1, further cylinders Z2-Z4 may be preferably provided, to which corresponding actuators are assigned.

Figure 2:
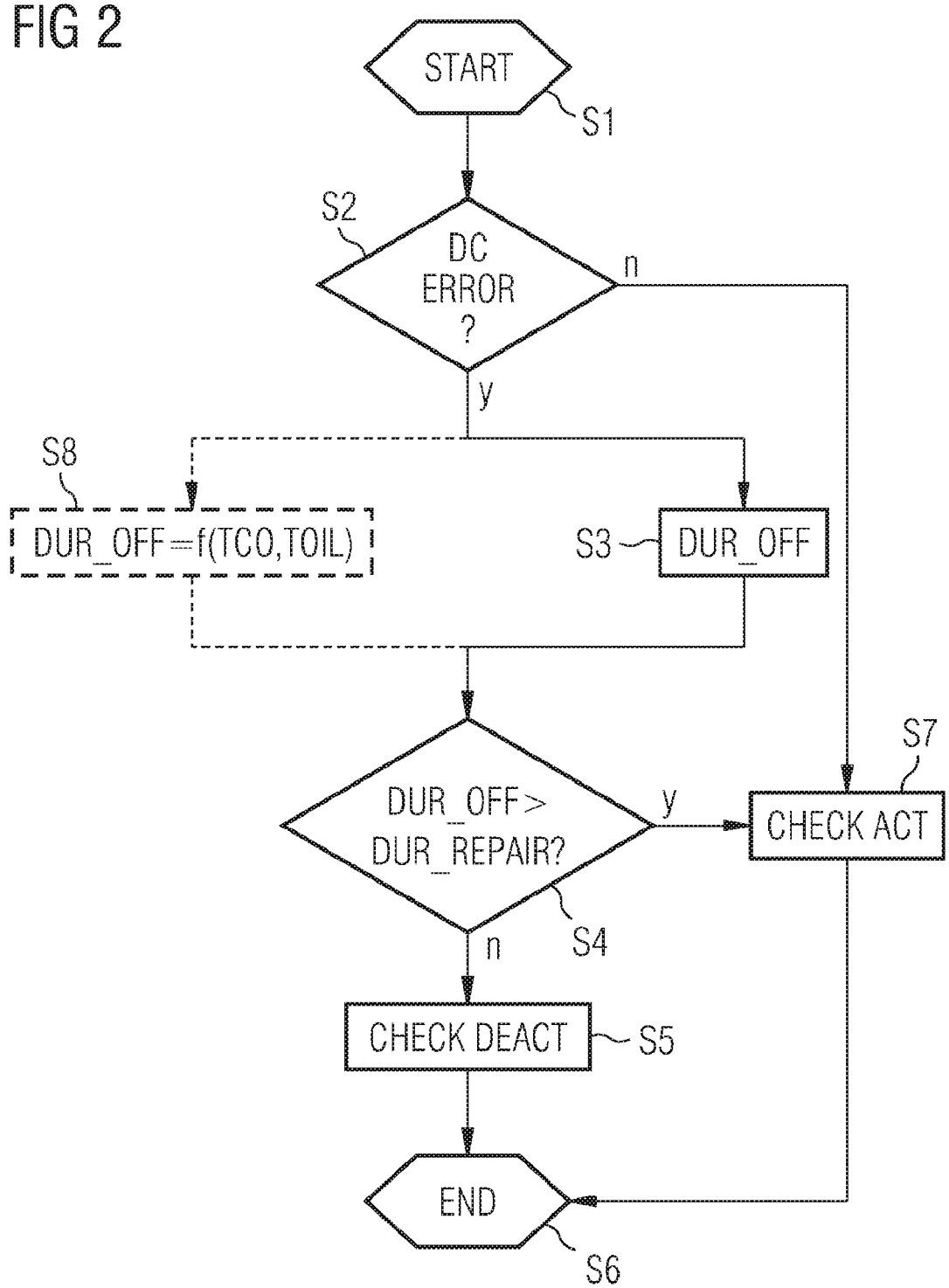
FIG. 2 a flowchart of a program for operating the internal combustion engine.

A program (FIG. 2) for operating the internal combustion engine can be preferably stored on a storage medium of the control device 25. The program serves only to control a combustion process in the combustion chamber 9 for the purpose of a check CHECK of the emission reduction system when the emission reduction system can function correctly. The program can be preferably started close to the time that the internal combustion engine is started in a step S1, in which variables are initialized if necessary.

In a step S2 a check is made as to whether in the previous driving cycle DC of the internal combustion engine an error ERROR of the emission reduction system was detected. In particular a check can be made in step S2 as to whether an error ERROR of the exhaust gas catalyzer 24 was detected. The error ERROR of the exhaust gas catalyzer typically relates to a lack of oxygen storage capability of the exhaust gas catalyzer 24. This can be checked for example, as in the prior-art document above. In such cases, to perform a check CHECK of the emission reduction system, a lean phase or a rich phase of motor operation is increased as regards its duration and/or as regards its air-fuel ratio. This explicitly feeds oxygen to the exhaust gas catalyzer 24 or removes it from the catalyzer. This is synonymous with increasing or reducing the degree of oxygen charging of the exhaust gas catalyzer 24. The effect of the increased lean phase or rich phase can be monitored by the exhaust gas probe 42 downstream of the exhaust gas catalyzer 24. Depending on the effect it is concluded that there has been or has not been an error ERROR of the emission reduction system. Thus during control of the combustion process for the purpose of checking CHECK of the emission reduction system the generation of pollutants of the combustion process is increased in relation to the operation of the internal combustion engine outside the checking CHECK of the emission reduction system. If the condition of step S2 is fulfilled, processing is continued in a step S3. If the condition of step S2 is not fulfilled, processing is continued in a step S7.

In step S3 an idle time DUR_OFF is determined, during which the internal combustion engine was switched off between the last driving cycle DC and the current driving cycle DC. The idle time DUR_OFF can for example be detected simply with a timer.

In a step S4 a check is made as to whether the idle time DUR_OFF is greater than a predetermined repair time DUR_REPAIR. The predetermined repair time DUR_REPAIR can for example be between 20 and 30 minutes. The predetermined repair time DUR_REPAIR is the time which is at least needed to give the exhaust gas catalyzer 24 heated up to operating temperature adequate time to cool down and to replace it. If the idle time DUR_OFF is less than the predetermined repair time DUR_REPAIR, the error ERROR of the emission reduction system cannot be rectified. If the condition of step S4 is not fulfilled, processing is continued in a step S5. If the condition in step S4 is fulfilled, processing is continued in the step S7.

In the step S7 the option ACT is activated of controlling the combustion process in the combustion chamber 9 for the purpose of controlling the checking CHECK of the emission reduction system.

In step S5 the control of the combustion process for the purpose of checking CHECK is deactivated DEACT. This enables the generation of pollutants in the combustion process to be increased merely for the purposes of checking CHECK the emission reduction system if the emission reduction system can function correctly. If the error ERROR has occurred in the last driving cycle DC and if the idle time DUR_OFF is less than the predetermined repair time DUR_REPAIR, a repair of the error ERROR was possible. This means that the generation of pollutants of the combustion process does not have to be increased for the purposes of checking CHECK of the emission reduction system.

The program can be ended in a step S6.

As an alternative to step S3 processing can also be continued in a step S8. In step S8 the idle time DUR_OFF can be determined as a function of the coolant temperature TCO and/or the oil temperature TOIL at the end of the last driving cycle DC and depending on the coolant temperature TCO or the oil temperature TOIL at the beginning of the current driving cycle DC.

The invention claimed is:

1. A method for operating an internal combustion engine, which includes an induction tract and an exhaust gas tract, that communicate with the at least one combustion chamber of the internal combustion engine depending on the switching position of at least one gas inlet valve or at least one gas exhaust valve, the method comprising the steps:

within a first driving cycle of the internal combustion engine, controlling a combustion process in the at least one combustion chamber for the purpose of checking an emission reduction system of the internal combustion engine, in a second driving cycle after the first driving cycle, checking as to whether an error of the emission reduction system was detected during the first driving cycle, determining an ignition off time of the internal combustion engine between the first and the second driving cycle if during the first driving cycle an error of the emission reduction system was detected, in the second driving cycle of the internal combustion engine, controlling the combustion process in the at least one combustion chamber only for the purpose of checking the emission reduction system if an error of the emission reduction system was detected during the first driving cycle and if the ignition off time was greater than a predetermined repair time.

2. The method according to claim 1, further comprising the step of monitoring, for checking the emission reduction system, an exhaust gas catalyzer of the internal combustion engine in respect of an oxygen storage capability of the exhaust gas catalyzer.

3. The method according to claim 1, further comprising the step of checking, in the second driving cycle of the internal combustion engine, the emission reduction system only if the ignition off time was longer than twenty minutes.

4. The method according to claim 1, further comprising the step of detecting the ignition off time by a timer.

5. The method according to claim 1, further comprising the step of determining the ignition off time by an oil temperature or a coolant temperature of the internal combustion engine being compared at the end of the first driving cycle with the oil temperature or the coolant temperature at the beginning of the second driving cycle and by the ignition off time being determined from the difference between the two oil temperatures or the two coolant temperatures.

6. A device for operating an internal combustion engine comprising an induction tract and an exhaust gas tract that communicate with the at least one combustion chamber of the internal combustion engine depending on the switching position of at least one gas inlet valve or at least one gas exhaust valve, with the device being operable to
control a combustion process in the at least one combustion chamber for the purposes of checking an emission reduction system of the internal combustion engine within a first driving cycle of the internal combustion engine,
check in a second driving cycle after the first driving cycle whether an error of the emission reduction system was detected during the first driving cycle,
determine an ignition off time of the internal combustion engine between the first and the second driving cycle, if an error of the emission reduction system was detected during the first driving cycle, and to
control the combustion process in the at least one combustion chamber only for the purpose of checking the emission reduction system in the second driving cycle of the internal combustion engine, if during the first driving cycle an error of the emission reduction system was detected and if the ignition off time was greater than a predetermined repair time.

7. The device according to claim 6, wherein, for checking the emission reduction system, the device is further operable to monitor an exhaust gas catalyzer of the internal combustion engine in respect of an oxygen storage capability of the exhaust gas catalyzer.

8. The device according to claim 6, wherein the device is further operable, in the second driving cycle of the internal combustion engine, to check the emission reduction system only if the ignition off time was longer than twenty minutes.

9. The device according to claim 6, wherein the device is further operable to detect the ignition off time by a timer.

10. The device according to claim 6, wherein the device is further operable to determine the ignition off time by an oil temperature or a coolant temperature of the internal combustion engine being compared at the end of the first driving cycle with the oil temperature or the coolant temperature at the beginning of the second driving cycle and by the ignition off time being determined from the difference between the two oil temperatures or the two coolant temperatures.

11. A software product stored on a computer readable medium, wherein the software when executed on a processor performs a method for operating an internal combustion engine, which includes an induction tract and an exhaust gas tract, that communicate with the at least one combustion chamber of the internal combustion engine depending on the switching position of at least one gas inlet valve or at least one gas exhaust valve, the method comprising the steps of:
within a first driving cycle of the internal combustion engine, controlling a combustion process in the at least one combustion chamber for the purpose of checking an emission reduction system of the internal combustion engine,
in a second driving cycle after the first driving cycle, checking as to whether an error of the emission reduction system was detected during the first driving cycle,
determining an ignition off time of the internal combustion engine between the first and the second driving cycle if during the first driving cycle an error of the emission reduction system was detected,
in the second driving cycle of the internal combustion engine, controlling the combustion process in the at least one combustion chamber only for the purpose of checking the emission reduction system if an error of the emission reduction system was detected during the first driving cycle and if the ignition off time was greater than a predetermined repair time.

12. The software product according to claim 11, further comprising the step of monitoring, for checking the emission reduction system, an exhaust gas catalyzer of the internal combustion engine in respect of an oxygen storage capability of the exhaust gas catalyzer.

13. The software product according to claim 11, further comprising the step of checking, in the second driving cycle of the internal combustion engine, the emission reduction system only if the ignition off time was longer than twenty minutes.

14. The software product according to claim 11, further comprising the step of detecting the ignition off time by a timer.

15. The software product according to claim 11, further comprising the step of determining the ignition off time by an oil temperature or a coolant temperature of the internal combustion engine being compared at the end of the first driving cycle with the oil temperature or the coolant temperature at the beginning of the second driving cycle and by the ignition off time being determined from the difference between the two oil temperatures or the two coolant temperatures.

* * * * *